(12) United States Patent
Henrici et al.

(10) Patent No.: US 12,320,515 B2
(45) Date of Patent: Jun. 3, 2025

(54) COOKING APPARATUS LIGHT

(71) Applicant: BJB GmbH & Co. KG, Arnsberg (DE)

(72) Inventors: Philipp Henrici, Arnsberg (DE); Olaf Baumeister, Sundern (DE); Frank Welslau, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 168 days.

(21) Appl. No.: 18/113,195

(22) Filed: Feb. 23, 2023

(65) Prior Publication Data

US 2023/0324039 A1     Oct. 12, 2023

(30) Foreign Application Priority Data

Apr. 7, 2022 (DE) .................. DE102022108426.4

(51) Int. Cl.
| | |
|---|---|
| *F24C 15/00* | (2006.01) |
| *F21V 33/00* | (2006.01) |
| *F21W 131/307* | (2006.01) |
| *F21Y 115/10* | (2016.01) |

(52) U.S. Cl.
CPC ........ *F21V 33/0044* (2013.01); *F24C 15/008* (2013.01); *F21W 2131/307* (2013.01); *F21Y 2115/10* (2016.08)

(58) Field of Classification Search
CPC ............. F21V 33/0044; F21V 2200/00; F24C 15/008; F24C 7/082; F24C 15/16; F24C 15/00; F24C 15/006; F24C 15/34; F24C 7/00; F21W 2131/307; F21Y 2115/10; G02B 6/001; G02B 6/0008; G02B 6/0006; G02B 6/0005; G02B 6/005; G02B 6/0091; H05B 6/6444; A21B 3/10; A47J 27/04; A47J 37/0664; A47J 36/00; A47J 2027/043; A47J 37/06; A47J 37/0629; F21S 41/141; F21S 41/24; F21K 9/61

See application file for complete search history.

(56) References Cited

U.S. PATENT DOCUMENTS

| | | | |
|---|---|---|---|
| 10,655,863 B1 * | 5/2020 | Signorino | F24C 15/008 |
| 2018/0259193 A1 * | 9/2018 | Lee | F21V 3/049 |

FOREIGN PATENT DOCUMENTS

| | | |
|---|---|---|
| CN | 108980917 B | 12/2018 |
| CN | 210069592 U | 2/2020 |
| DE | 102011080073 A1 | 1/2013 |
| DE | 102014203532 A1 | 8/2015 |

(Continued)

OTHER PUBLICATIONS

SEARCH English translation of DE-102018111092-A1 (Year: 2019).*

*Primary Examiner* — Omar Rojas Cadima
(74) *Attorney, Agent, or Firm* — Von Rohrscheidt Patents

(57) ABSTRACT

A food processing appliance (1) has a muffle interior (M) surrounded by a muffle (2; 32) and a light generating device (3) arranged outside the muffle (2; 32) for radiating light (L) into the muffle interior (M) through a Opening (16; 33) in the muffle (2; 32), wherein in the muffle interior (M) a light distribution element (18; 58) for distributing light (L) that can be radiated through the opening (16; 33), is arranged and between the light generating device (3) and the light distribution element (18; 58) there is a gap (S). The invention can be applied particularly advantageously to cooking appliances with an oven functionality and/or with a microwave functionality.

7 Claims, 8 Drawing Sheets

(56) References Cited

FOREIGN PATENT DOCUMENTS

| | | |
|---|---|---|
| DE | 102015225992 A1 | 6/2017 |
| DE | 102018111092 A1 * | 11/2019 |
| DE | 102018118504 A1 | 2/2020 |
| EP | 1811227 A1 | 7/2007 |
| EP | 3 139 096 B1 | 3/2018 |
| EP | 3 819 545 A1 | 5/2021 |
| KR | 20180104401 A | 9/2018 |

* cited by examiner

COOKING APPARATUS LIGHT

RELATED APPLICATIONS

This application claims priority from and incorporated by reference German Patent Application DE 10 2022 108 426.4 filed on Apr. 7, 2022.

FIELD OF THE INVENTION

The invention relates to a cooking apparatus light, in particular a light for ovens, microwave ovens or steam cookers, The invention also relates to a cooking apparatus including the cooking apparatus light.

Cooking apparatus lights are well known in the art, some of them use conventional incandescent bulbs e.g. disclosed in EP 1 811 227 A1. Increasingly, however, cooking apparatus lights using LED technology are being employed as disclosed e.g. in EP 3 819 545 A1.

In particular in generic cooking apparatus lights which use LED illuminants temperature management of the cooking apparatus light is very important. LEDs are rather temperature sensitive so that their service life significantly decreases when a certain operating temperature is exceeded. This contradicts the requirement that the LED light has to remain functional over an entire service life of the cooking apparatus since it is not replaceable by the user of the cooking apparatus light. Thus, illumination technology for cooking apparatus has to solve two problems. On the one hand side, the waste heat from operating the LED has to be rejected. On the other hand side, the cooking apparatus, in particular ovens and steam cookers, but also modern microwave ovens with e.g. an additional grilling function generate a significant amount of heat. Thus, a temperature sensitive illuminant has to be used in an environment with inherently high temperature.

Thus, LED illuminants are more and more protected from the waste heat of the cooking cavity by technical devices.

It is known e.g. from EP 3 139 096 B1 to stack heat shields in front of the LED in order to protect the LED from heat radiation. EP 3 819 545 A1 uses light conductor elements in particular a light conductor rod. The light conductor rod facilitates arranging the LED at a distance from the cooking cavity in the cooking apparatus and introducing the light emitted by the LED over a larger distance into the cooking cavity.

DE 10 2008 118 504 A1 shows a comparable solution, thus the actual illuminant, a LED lamp is arranged outside of the cooking cavity. Light conductor rods that are arranged parallel to the cooking cavity wall and outside of the cooking cavity wall conduct the light into light boxes also arranged outside the cooking cavity. The light boxes themselves lead into wall cut outs, receive reflectors or have reflective properties themselves. This way light fed through the light conductor into the light box is fed into the cooking cavity through a wall opening which may be closed by a protective glass pane. A comparable solution was introduced by the applicant at the International Radio Show in 2015.

BRIEF SUMMARY OF THE INVENTION

Improving upon applicants show presentation or DE 10 2018 118 504 A1 it is an object of the invention to provide a cooking apparatus light that is improved with respect to temperature management and ease of fabrication.

The object is achieved by a cooking apparatus light for ovens, microwave ovens or steam cookers, the cooking apparatus light comprising: an illuminant configured as a circuit board including a LED arranged on the circuit board; a light box that is fed with light emitted by the LED; a light conductor rod arranged between the illuminant and the light box and that conducts the light emitted by the LED to the light box; a protective tube arranged between the light box and the illuminant and that envelops and protects the light conductor rod; a circumferential gap between the light conductor rod and the protective tube, so that the light conductor rod is supported without contacting the protective tube; a mounting device which supports the illuminant and a first end of the productive tube and a first end of the light conductor rod; an arrangement device which fixes the protective tube and the light conductor rod at the light box; a centering member which envelops the light conductor rod and arranges the light conductor rod in the protective tube while maintaining the circumferential gap between the light conductor rod and the protective tube, wherein the centering member forms the arrangement device that fixes the light conductor rod at the light box.

Thus, the centering member is configured as a centering sleeve, into which the light conductor rod is inserted and the light conductor box includes an insertion opening that receives the centering member.

The invention advantageously uses the centering member to arrange the light conductor rod in the light box, and thus integrates functions in one component that were performed by plural components in the prior art.

When the centering member is made from a material with poor heat conductivity, e.g. from a synthetic material or an elastomeric material or from a graphite ring that envelops the light conductor rod, a temperature decoupling between the light conductor box and the light conductor rod is implemented in a particularly simple manner. This way the LED illuminant can be protected from temperature effects from the cooking cavity.

The centering member can perform an additional sealing function in a particularly advantageous embodiment. Thus, the centering member is advantageously configured as a sleeve shaped sealing element which is inserted into the circumferential gap between the light conductor rod and the protective tube and which seals the circumferential gap relative to a space formed by the light box. This way it is prevented that cooking vapors from the cooking cavity penetrate through the light box into the protective tube enveloping the light conductor rod and settle on the light conductor rod. The particles included in the cooking vapors would cause light decoupling through the adhesion at the light conductor rod. The light losses thus created can significantly reduce the efficiency of the cooking apparatus light.

The protective tube can be furthermore provided with a reflective inner surface in order to direct light back into the light conductor rod that has been decoupled from the light conductor rod, due to systemic properties.

When the light conductor rod is fixed in the light box by a centering member made from a dampening material, e.g. an elastomeric material, the centering member furthermore dampens vibrations. The centering member protects the light conductor rod during transportation and during regular operations against impulse forces. Additionally, the centering member compensates different expansion properties of the materials under heat impact.

The centering member can be fixed at the light box in a particularly simple manner when the centering member includes interlocking devices, in particular a circumferential interlocking lip, at an outer circumference which interlocks the centering member in the insertion opening of the light box.

In order to further simplify assembly of the cooking apparatus light, the centering member is used as the arrangement device for fixing the protection tube at the light box, in particular when the centering member forms an annular wall which is arranged in the protective tube in order to provide fixing at the light box and that supports the protective tube at least by friction locking.

When the centering member does not only function as the arrangement device for the light conductor rod at the light box but also for the protective tube, the advantages recited supra also apply to the protective tube. The thermal decoupling as well as the protection against concussions can thus also be implemented for the protective tube. Different thermal expansions of light conductor rod, protective tube and light box can be compensated by the centering member. Additionally in particular applying the protective tube to an annular wall and the friction locking support provide a substantial facilitation for assembly. A form locking between the centering member and the protective tube, e.g. through interlocking elements is possible and advantageous. Additionally, the centering member can also seal relative to the protective tube so that a penetration of fluids between the centering member and the protective tube wall is precluded.

Additionally, the interlocking device and the annular wall are arranged at opposite ends of the centering member.

In order to further simplify assembly of the cooking apparatus light through a straight plug-in assembly, the assembly device forms a hollow cylindrical spout including a cylindrical cavity that supports the light conductor rod and whose cylindrical wall is received by the protective tube at least through form locking.

The invention also relates to a cooking apparatus including the cooking apparatus light described supra.

BRIEF DESCRIPTION OF THE DRAWINGS

Further advantages of the invention and a better comprehension thereof can be derived from the subsequent description of an advantageous embodiment with reference to drawing figures, wherein.

DETAILED DESCRIPTION OF THE INVENTION

Figure 1:
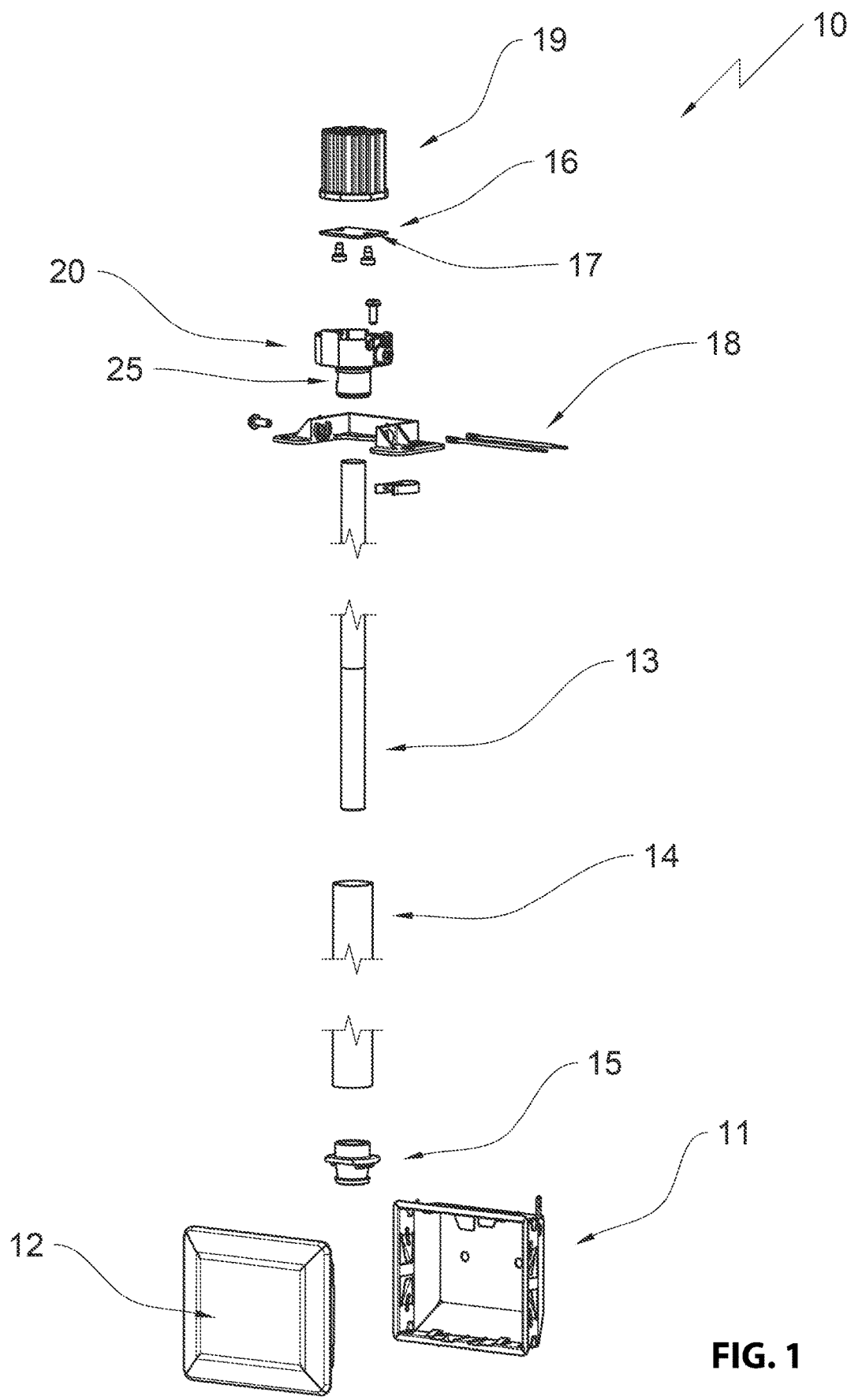
FIG. 1 illustrates a cooking apparatus light according to the invention in an exploded view.

The cooking apparatus light according to the invention is designated overall with reference numeral 10 in the drawing figures. FIG. 1 shows an exploded view of the cooking apparatus light 10.

The cooking apparatus light 10 includes a light box 11 with a cover glass 12, a light conductor rod 13 supported in a protective tube 14, wherein a centering member 15 supports the light conductor rod 13 and the protective tube 14 in the light box 11.

A circuit board 17 including a LED arranged thereon functions as a illuminant 16 that is provided with electricity by connecting conductors 18 and that is arranged on a cooling element 19.

An assembly device designated overall with the reference numeral 20 arranges the cooking apparatus light at the cooking apparatus.

Figure 2:
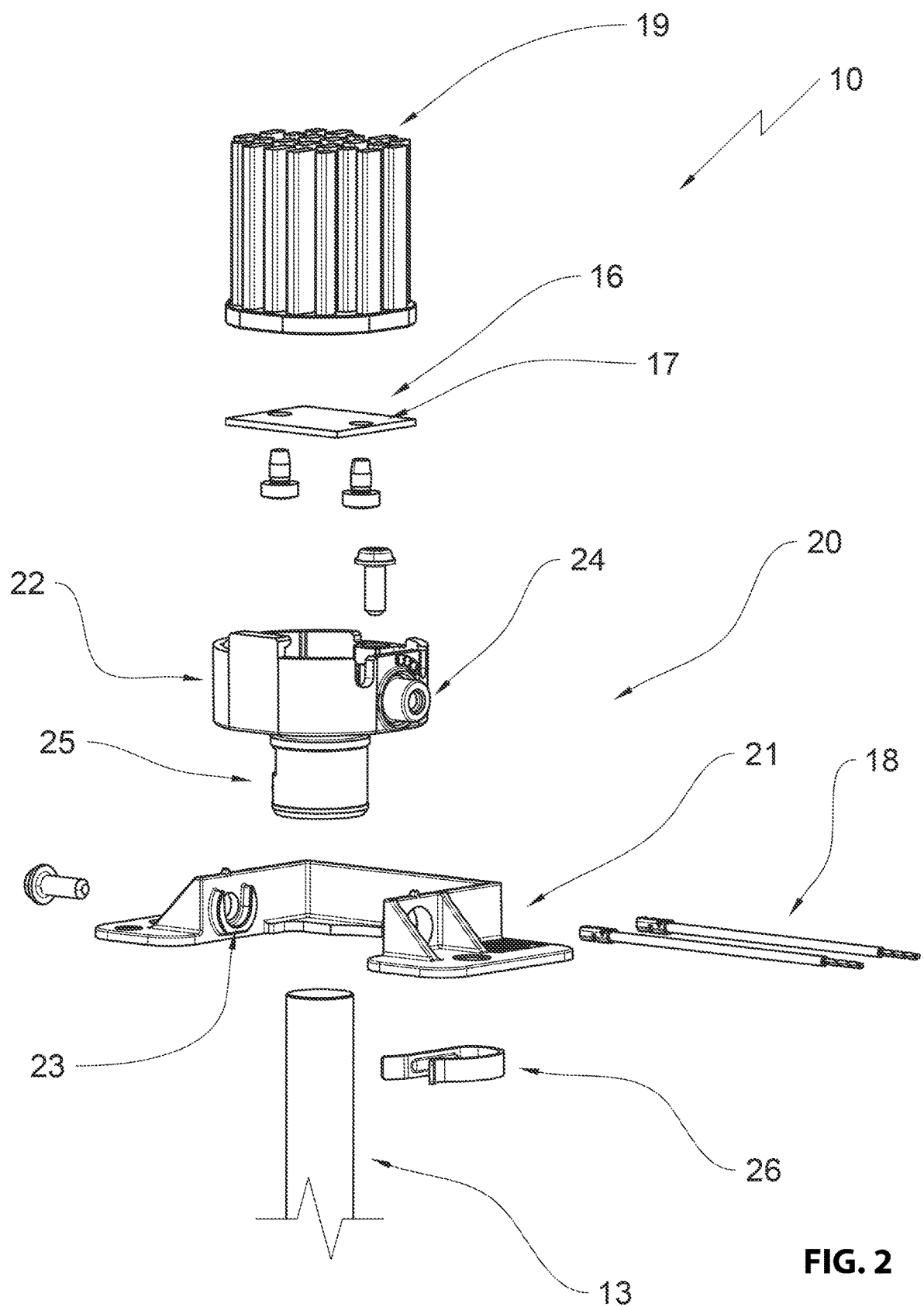
FIG. 2 illustrates a first blown-up partial view of the exploded view according to FIG. 1.

FIG. 2 shows the end of the cooking apparatus light 10 oriented towards the illuminant in an exploded view. According to FIG. 2, the mounting device 20 includes a mounting plate 21 in which a mounting pot 22 is arranged. For this purpose, bearing shells 23 are arranged at the mounting plate 21, wherein the pivot journals 24 are inserted into the mounting plate so that the mounting pot 22 is pivotably inserted into the mounting plate 21. The mounting pot 22 receives the conductor plate 17 and supports the cooling body 19. On the other hand side, the mounting pot 22 includes a hollow cylindrical spout 25 forming part of the mounting device 20. The light conductor rod 13 penetrates into the hollow cylindrical spout 25 and is supported therein by a support clamp.

Figure 3:
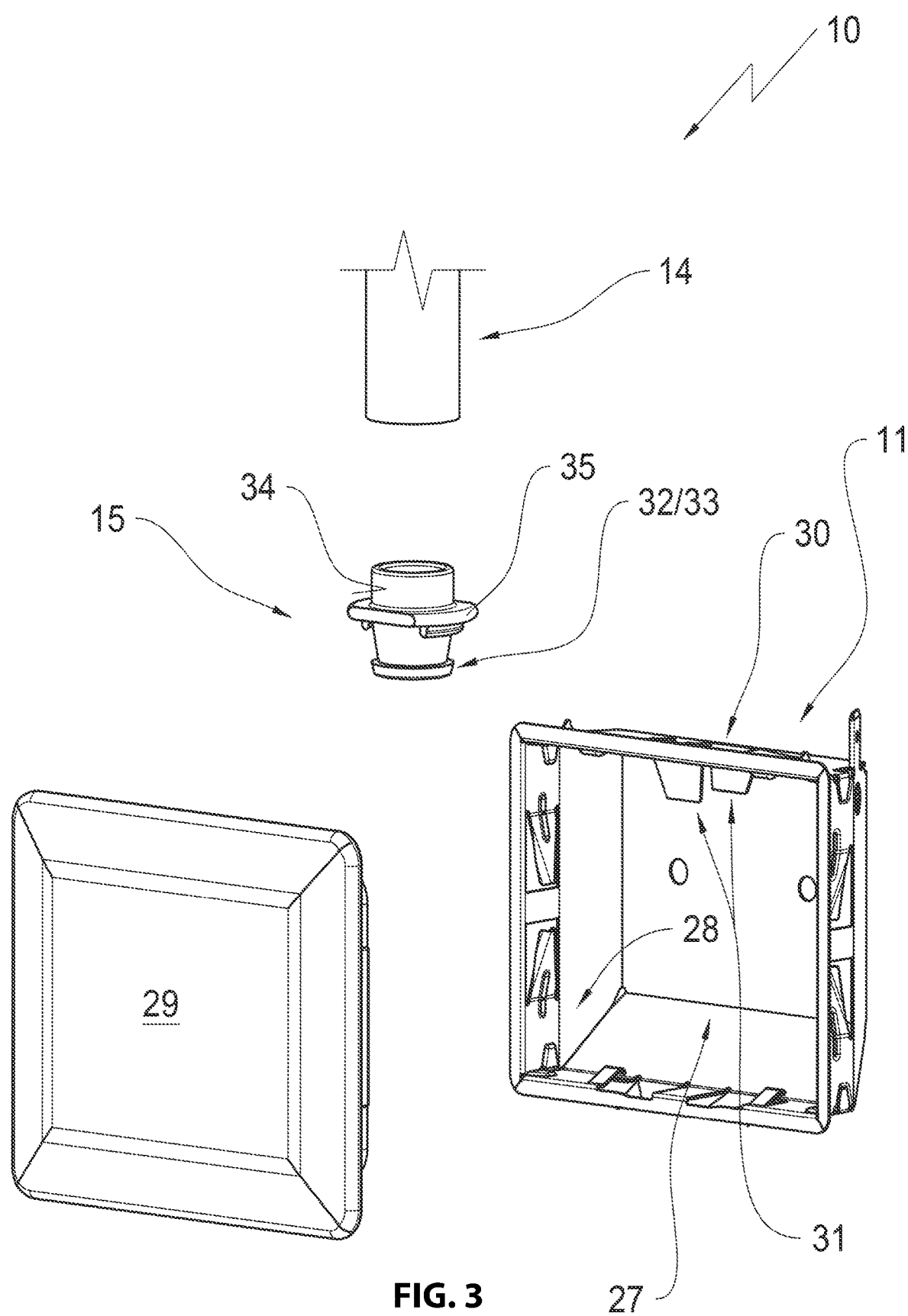
FIG. 3 illustrates a second partial view of the exploded view according to FIG. 1.

FIG. 3 shows a light box side end of the cooking apparatus light 10 in a blown-up exploded view. The light box 11 forms a reflector cavity 27 that is either provided with reflective surfaces or that can receive reflective devices. Light that is introduced into the light box 11 can be fed into a cooking apparatus through a light exit opening 28, wherein the light exit opening 28 is closable by a glass cover 29 in order to protect the reflector cavity 27. Two support tongues 31 are respectively arranged at each side of the insertion opening 30 of the light box 11. The centering member 15 is configured as a centering sleeve which envelops the light conductor rod 13. The centering member 15 includes an interlocking device configured as a circumferential interlocking lip 33 at an end oriented towards the reflector cavity 27. The end oriented towards the reflector cavity 27 forms an annular wall 34 that is used as an arrangement device for the protective tube 14, which is slidable onto an outer circumference of the annular wall 34 with friction locking. A stop washer 35 limits the slide on travel of the protective tube 14 onto the annular wall 34.

Figure 4:
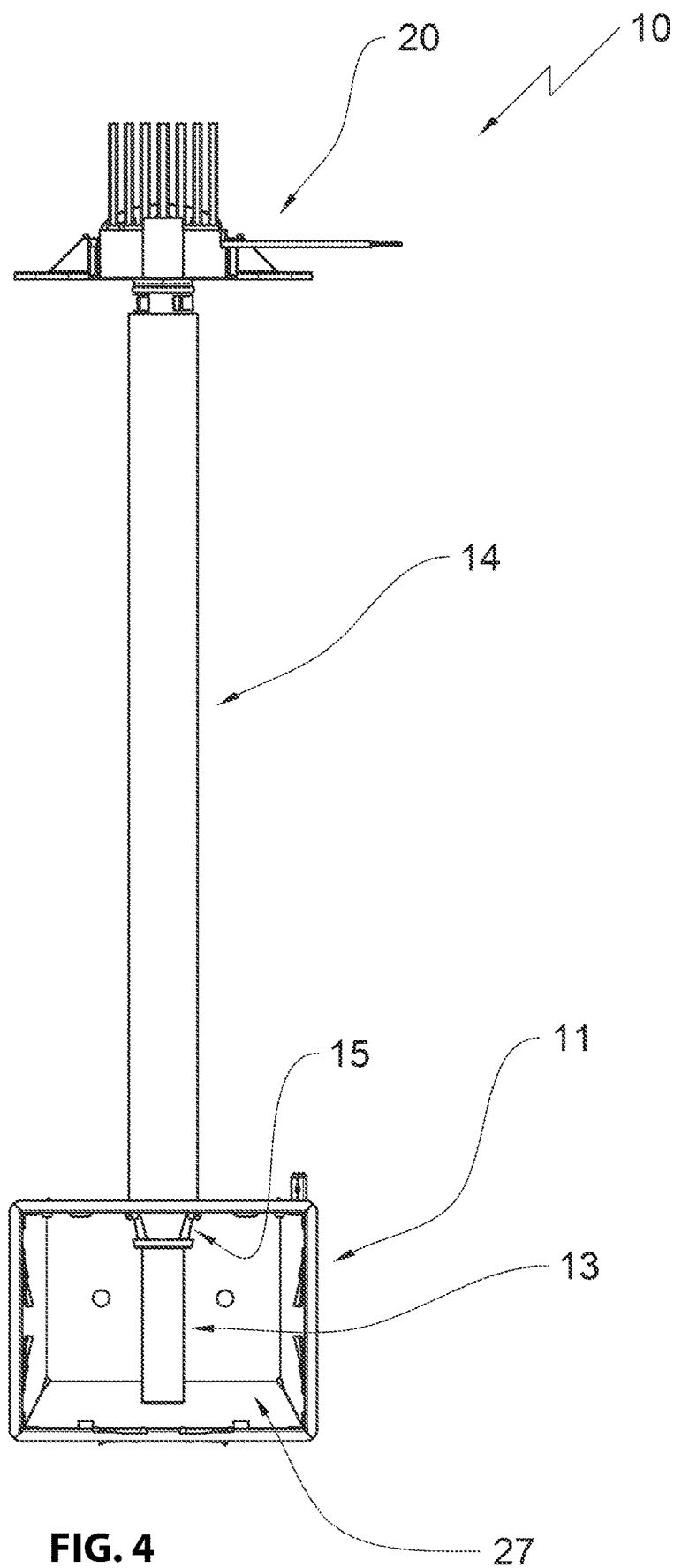
FIG. 4 illustrates a view of the cooking apparatus light according to the invention into a space defined by the light box.
Figure 5:
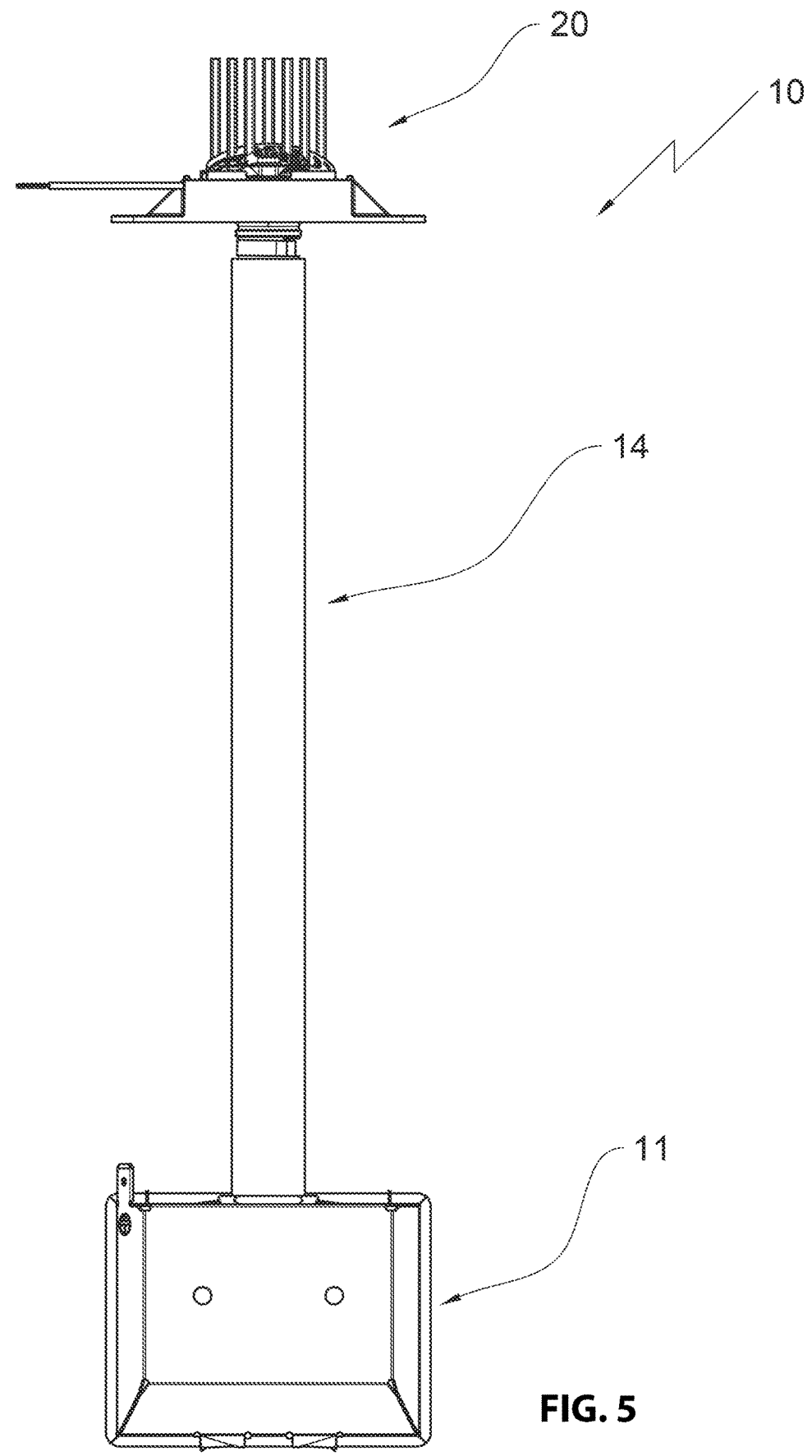
FIG. 5 illustrates the cooking apparatus light according to FIG. 4 looking at the back side of the light box.

FIGS. 4 and 5 show the assembled cooking apparatus light 10 looking towards the light exit opening 28 of the light box 11 (FIG. 4) or towards a rear wall of the light box 11 (FIG. 5).

Both figures show that the protective tube 14 extends between the light box 11 and the assembly device 20 including the illuminant 16 arranged therein and thus offsets the illuminant 16 from the light box 11 and its reflector cavity 27. It is evident in particular from FIG. 4, that the light conductor rod 13 runs from the protective tube 14 and through the centering member 15 into the reflector cavity of the light box 11 and furthermore extends to the illuminant 16 and is arranged within the protective tube 14.

Thus, the light conductor rod 13 feeds light emitted by the illuminant 16 into the light box 11 so that the light is conducted from there by reflectors out of the light exit opening 28 and projected into a cooking cavity 40.

Figure 6:
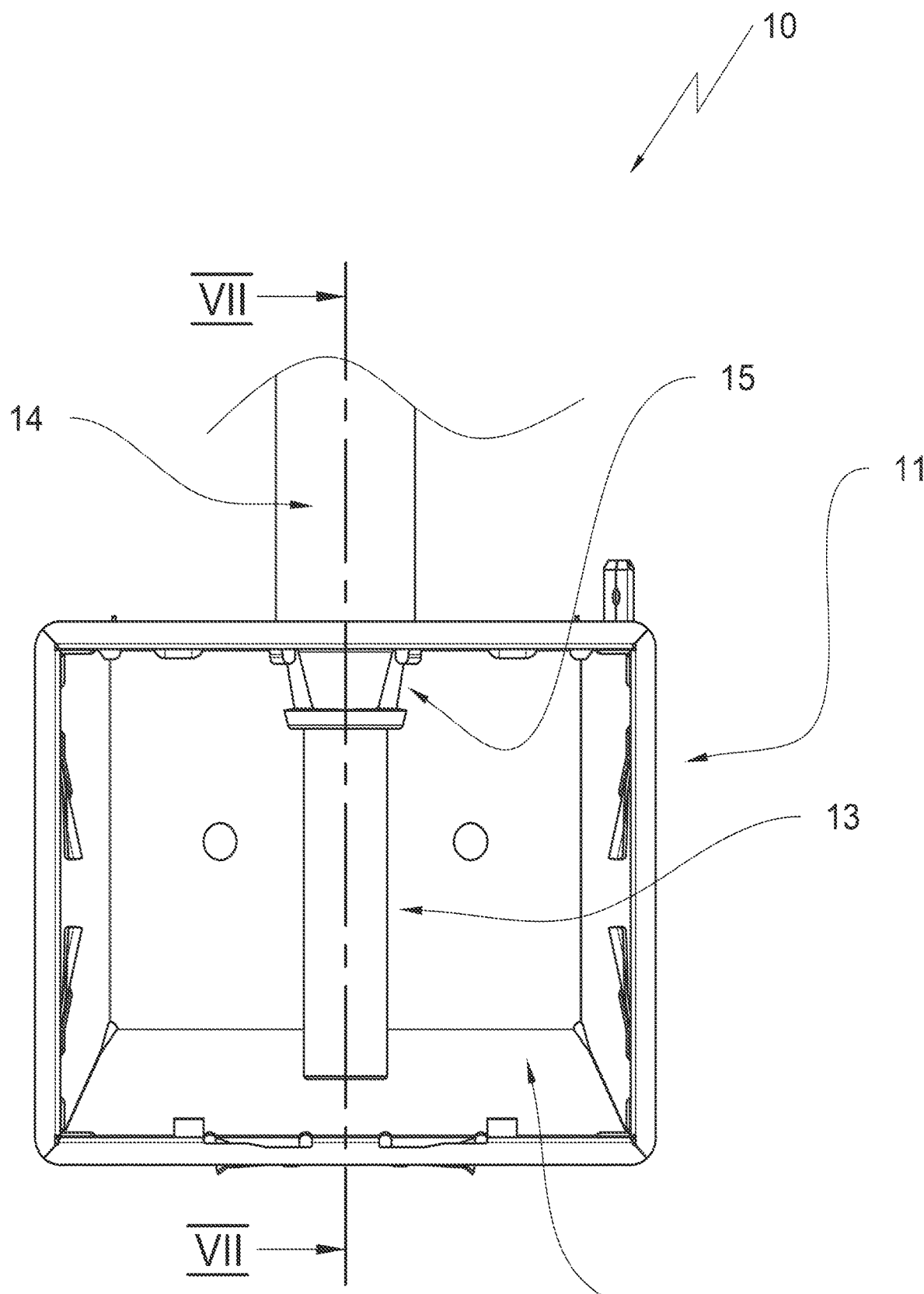
FIG. 6 illustrates a partial view of the cooking apparatus light according to FIG. 4.

FIG. 6 shows a blown-up detail of the lower end of the cooking apparatus light 10 according to FIG. 4. It is evident in particular how the light conductor rod 13 is supported in centering member 15 and arranged in the reflector cavity 27 of the light box 11.

Figure 7:
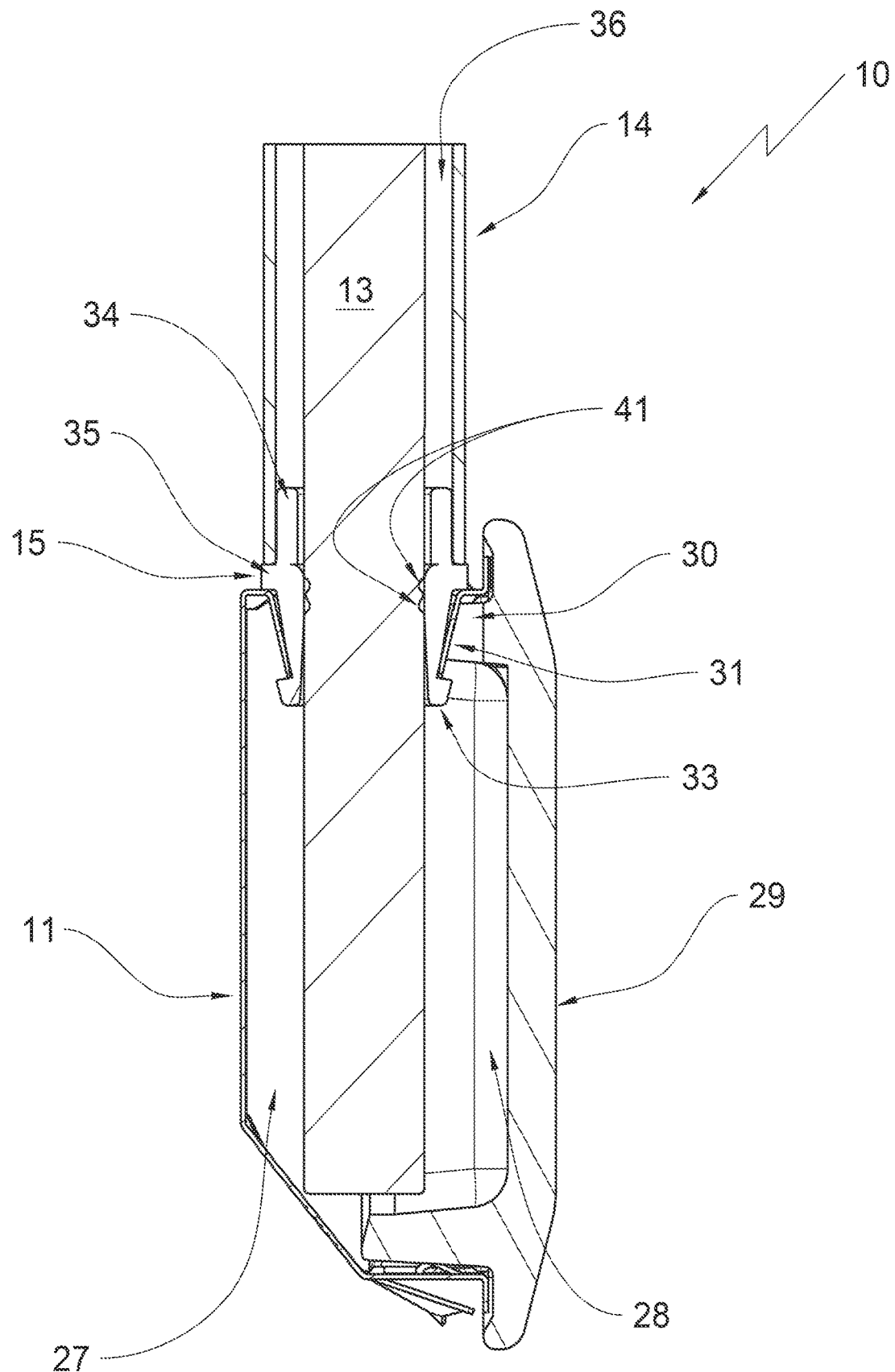
FIG. 7 illustrates a sectional view according to the sectional line VII-VII in FIG. 6.

FIG. 7 shows a sectional view along the sectional line VII-VII in FIG. 6.

The configuration and function of the centering member 15 is now described again with reference to FIG. 7. The partial representation of the cooking apparatus light 10 according to FIG. 7 shows a section of the protective tube 14 and of the light conductor rod 13. The light conductor rod 13 reaches into the reflector cavity 27 of the light box 11. The light exit opening 28 is closed by the light permeable cover glass 29.

The centering member 15 is a sleeve element that is provided with an interlocking lip 33 at an end that is oriented towards the light box 11 or the reflector cavity 27 wherein the interlocking lip interlocks behind the retaining tongues 31 of the light box 11. This way the centering member 15 is protected against being pulled out of the light box 11. The centering member 15 furthermore contacts the outside of the wall forming the light box 11 with a contact washer 35 arranged about a full circumference of the sleeve element so that the centering member is secured against further penetration into the light box 11 or the reflector cavity 27.

It is appreciated that the centering member 15 is attachable in a particularly simple manner at the light box 11 by inserting the centering member into the insertion opening 30 of the light box wall until the contact disc 35 limits the insertion travel and the interlocking lip 33 reaches behind the retaining tongues of the light box 11 at the same time.

It is then evident from FIG. 7 that the centering member 15 supports the light conductor rod 13 in its hollow cylindrical interior, and reliably offsets the light conductor rod 13 from the wall of the protective tube 14 by a circumferential gap 36. A contact of the light conductor rod 13 and the protective tube 14 which would lead to a decoupling of light from the light conductor rod 13 and to damages to the light conductor rod 13 is reliably prevented by the centering member 15. Additionally, the centering member 15 reliably supports the light conductor rod 13 at the light box 11.

The centering member 15 also performs a sealing function in the embodiment shown in FIG. 7. The sealing function is assured on the one hand side by essentially gapless contact with the inner sleeve wall at the light conductor rod 13. Additionally, the centering member 15 includes at least one sealing lip 41, in the embodiment actually two sealing lips 41 on an inside circumferentially arranged and oriented towards the light conductor rod 13, wherein the sealing lips contact an outer circumferential surface of the light conductor rod 13. The sealing lips 41 advantageously compensate dimensional and manufacturing tolerances. Additionally, there is the option to produce the centering member 15 in a 2-component injection molding process in order to integrally mold elastic seal lips 41 at a body that is otherwise made from a synthetic material in order to implement the sealing function.

It is also theoretically conceivable to make the centering member 15 from a ceramic or metal material and to apply elastic sealing lips 41 to an inner circumference.

Forming the centering member 15 from a material with low thermal conductivity like a synthetic or ceramic material is advantageous since thermal decoupling between the light conductor rod 13 and the light box 11 can be implemented in this manner.

The centering member 15 includes an axially oriented annular wall 34 that is oriented away from the centering box 11 and that originates from the contact disc 35 and that is received by the end of the protective tube 14 that is oriented towards the light box. The protective tube 14 envelops the annular wall 14 at least by friction locking and is thus fixed at the light box 11. A form locking connection through interlocking devices or interlocking contours for additionally securing the protective tube 14 on the centering member 15 can also be implemented.

A face of the protective tube 14 that is oriented towards the light box contacts the contact disc 35, which limits the slide on travel of the protective tube 14 on the annular wall 34. Simultaneously the contact disc 35 offsets the protective tube 14 from the light box wall so that the centering member 15, when made from a suitable material, thermally decouples the protective tube 14 from the light box 11.

The annular wall 34 can also seal the circumferential gap 36 relative to ambient using suitable sealing contours or a suitable material when the annular wall contacts the protective tube 14 without gap in order to prevent that fluids or foreign objects penetrate into the circumferential gap 36.

The sealing function of the centering member 15 is an advantageous feature since a penetration of foreign objects or cooking vapors into the annular gap 36 can cause an adhesion of particles at the light conductor rod 13. This would cause a light decoupling out of the light conductor rod 13 which reduces an overall efficiency of the cooking apparatus light 10.

Figure 8:
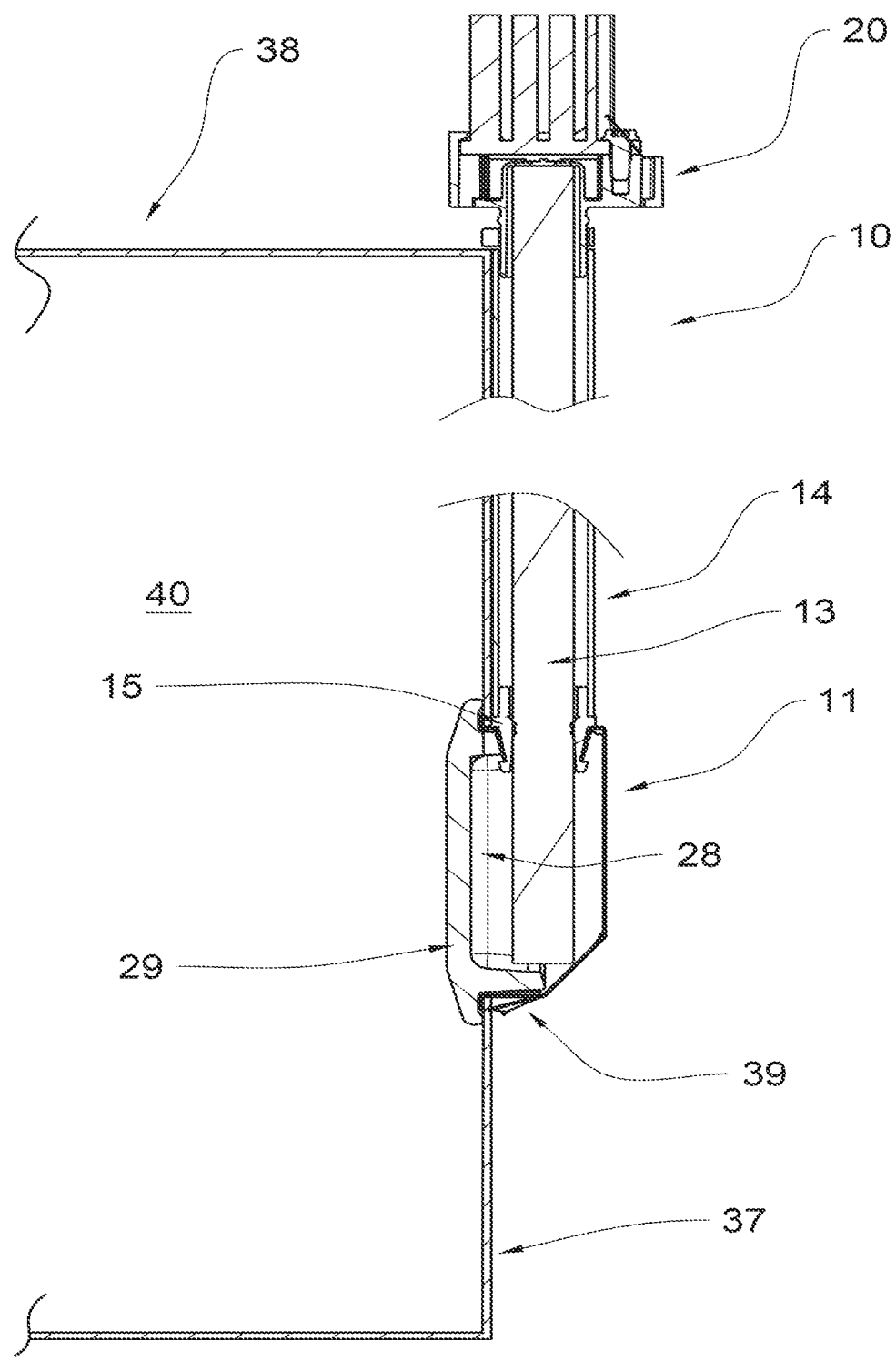
FIG. 8 illustrates a schematic view of a cooking apparatus with the cooking apparatus light according to the invention according to FIG. 1.

FIG. 8 shows a schematic arrangement of the cooking apparatus light 10 according to the invention at a cooking apparatus wall 37 of a cooking apparatus 38. The cooking apparatus wall 37 includes a wall cut out 39 in which the light box 11 is supported wherein the light exit opening 28 of the light box 11 is oriented towards the cooking cavity 40 of the cooking apparatus 38. This way light of the cooking apparatus light 10 can be fed into the cooking cavity 40 through the light exit opening 28 and its cover glass 29.

The protective tube 14 with the light conductor rod 13 arranged therein is supported at an outside of the cooking cavity along a side wall of the cooking cavity and supported in the mounting device 20 at an end of the light conductor rod 13 oriented away from the light box 11.

The mounting device 20 is attached at a suitable counter piece of the cooking apparatus 38. This way the cooking apparatus light 10 is reliably arranged and supported in the cooking apparatus 38 wherein the illuminant 16 is sufficiently offset and thermally decoupled in an optimum manner by the centering member 15. Excessive thermal loading of the illuminant 16 through heat generated in the cooking cavity 40 is thus reliably prevented.

The invention overall provides a cooking apparatus light 10 advantageously configured with a centering member 15. The centering member 15 performs a multitude of important functions in addition to the centering function of the light conductor rod 13 in the protective tube 14 and thus combines a number of components that were separate before. Thus, the centering member 15 supports the light conductor rod 13 and the protective tube 14 at the light box 11 and thermally decouples the light conductor rod 13 and the protective tube 14 from the light box 11. The centering member 15 performs a sealing function with respect to the protective tube 14 and the light conductor rod 13, which protects the light conductor rod 13 inserted into the protective tube 14 against contamination, light decoupling caused by the contamination and a resultant reduction in efficiency.

REFERENCE NUMERALS AND DESIGNATIONS 10 cooking apparatus light
11 light box 12 cover glass
13 light conductor rod
14 protective tube
15 centering member
16 illuminant
17 circuit board
18 connecting conductor
19 cooling element
20 mounting device
21 mounting plate
22 mounting pot
23 bearing shell
24 pivot journal
25 hollow cylindrical spout
26 retaining clamp
27 reflector cavity
28 light exit opening
29 cover glass
30 insertion opening
31 retaining tongue
32 interlocking device
33 interlocking lip
34 annular wall
35 contact disc
36 circumferential gap
37 cooking cavity wall
38 cooking apparatus
39 wall cut out
40 cooking cavity
41 sealing lip

What is claimed is:

1. A cooking apparatus light for ovens, microwave ovens or steam cookers, the cooking apparatus light comprising:
an illuminant configured as a circuit board including a LED arranged on the circuit board;
a light box with light emitted by the LED;
a light conductor rod extending from the illuminant into the light box and that conducts the light emitted by the LED into the light box:
a protective a arranged en the light box and the illuminant and that envelops and protects the light conductor rod;
a circumferential gap the light conductor rod and the protective tube, so that the light conductor rod is supported without contacting the protective tube;
a mounting device which supports the illuminant and a first end of the protective tube and a first end of the light conductor rod;
an arrangement device which fixes the protective tube and the light conductor rod at the light box;
a centering member which envelops the light conductor rod and arranges the light conductor rod in the protective tube while maintaining the circumferential gap between the light conductor rod and the protective tube,
wherein the centering member forms the arrangements device that fixes the light conductor rod at the light box,
wherein the centering member is a cylindrical sleeve shaped seal that seals the circumferential gap between the light conductor rod and the protective tube relative to an internal space formed by the light box,
wherein the light box includes an insertion opening into which the centering member that circumferentially envelops the light conductor rod is inserted, wherein the catering member also forms the arrangements device that fixes the protective tube at the light box.

2. The cooking apparatus light according to claim 1, wherein the centering member supports interlocking devices configured as an externally circumferential interlocking lip that interlocks the centering member in the insertion opening of the light box.

3. The cooking apparatus light according to claim 2,
wherein the centering member forms an external annular wall which is seated in the protective tube and fixes the protective tube at the centering member at least by friction locking so that the protective tube is fixed at the light box, and
wherein the interlocking device and the annular wall are arranged at opposite ends of the centering member.

4. The cooking apparatus light according to claim 2, wherein the externally circumferential interlocking lip is arranged at a conical circumferential external surface of the centering member, so that the centering member is interlockable in the Insertion opening of the light box by a retaining tongue that engages the conical circumferential surface of the centering member and the circumferential interlocking lip.

5. The cooking apparatus light according to claim 1, wherein the centering member forms an external annular wall which is seated in the protective tube and fixes the protective tube at the centering member at least by friction locking so that the protective tube is fixed at the light box.

6. The cooking apparatus light according to claim 1,
wherein the mounting device forms a hollow cylindrical spout including a cylindrical cavity that supports the light conductor rod, and
wherein an external cylindrical wall of the hollow cylindrical spout is received by the protective tube at least by friction locking.

7. A cooking apparatus, comprising:
a cooking cavity enveloped by a cooking cavity wall;
an opening in the cooking cavity wall configured to receive the cooking apparatus light according to claim 1,
wherein the light box Is arranged at the opening of the cooking cavity wall and the protective tube is supported outside of the cooking cavity along the cooking cavity wall.

* * * * *